United States Patent Office.

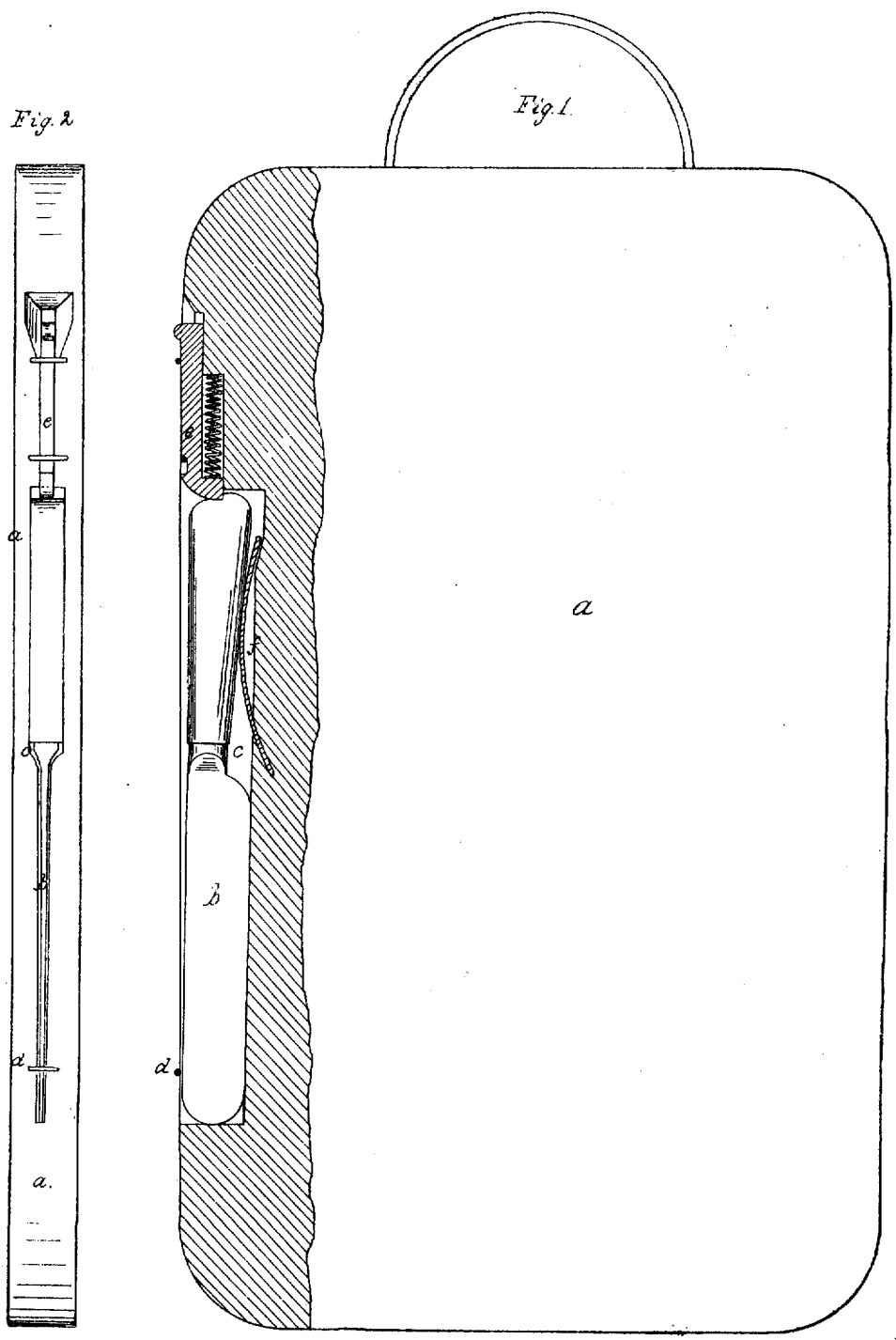
W. H. Lewis.
Bread-Board.
N° 73104   Patented Jan. 7, 1868.
Witnesses
Inventor

WILLIAM H. LEWIS, OF NEW YORK, N. Y.

Letters Patent No. 73,104, dated January 7, 1868; antedated December 24, 1867.

IMPROVED BREAD-BOARD.

*The Schedule referred to in these Letters Patent and making part of the same.*

TO ALL WHOM IT MAY CONCERN:

Be it known that I, WILLIAM H. LEWIS, of the city and State of New York, have invented, made, and applied to use, a certain new and useful Improvement in Boards upon which to Cut Bread, &c.; and I do hereby declare the following to be a full, clear, and exact description of the said invention, reference being had to the annexed drawing, making part of this specification, wherein—

Figure 1 is a plan of said board, with one side thereof in section, to show the knife in its case, and Figure 2 is an elevation of the knife and edge of the board.

Similar letters designate the same parts.

Bread is usually cut upon a board especially provided for that purpose, and a knife is required that is sufficiently thin and sharp, or the bread will not be smoothly cut. It is important that the bread-knife be used exclusively for cutting bread, in order that it may remain sufficiently sharp, or be easily sharpened.

The nature of my said invention consists in a cutting-board and knife-case combined, so that the knife may be placed in its case as soon as used, and hung up or stood away with the board, and, therefore, is always in place for use, and out of the way of being injured, or being employed for general purposes. My combined knife-case and cutting-board is a new article of manufacture.

In the drawing, $a$ is the cutting-board, of suitable size and shape, provided with a loop at one end, by which it may be hung up. $b$ is the cutting-knife, shown as within the case $c$, that is formed by a mortise in the edge of the board, of a size and shape for receiving the knife. $d$ is a cross-wire or plate, beneath which the blade of the knife is inserted, and $e$ is a spring-bolt, taking a notch in the handle of the knife, to hold the same within the bread-board, when not required for use. $f$ is a spring that throws out the handle of the knife when the spring-bolt or catch $e$ is withdrawn. My cutting-board, formed with a recess or case for receiving a knife, is a new and useful article of manufacture.

What I claim, and desire to secure by Letters Patent, is—

The cutting-board for bread, &c., formed with a recess or case for receiving the knife, as set forth.

In witness whereof, I have hereunto set my signature, this seventeenth day of May, A. D. 1867.

W. H. LEWIS.

Witnesses:
GEO. T. PINCKNEY,
GEO. D. WALKER.